J. Hyter,
Fly Trap,
Nº 15,378. Patented July 22, 1856.
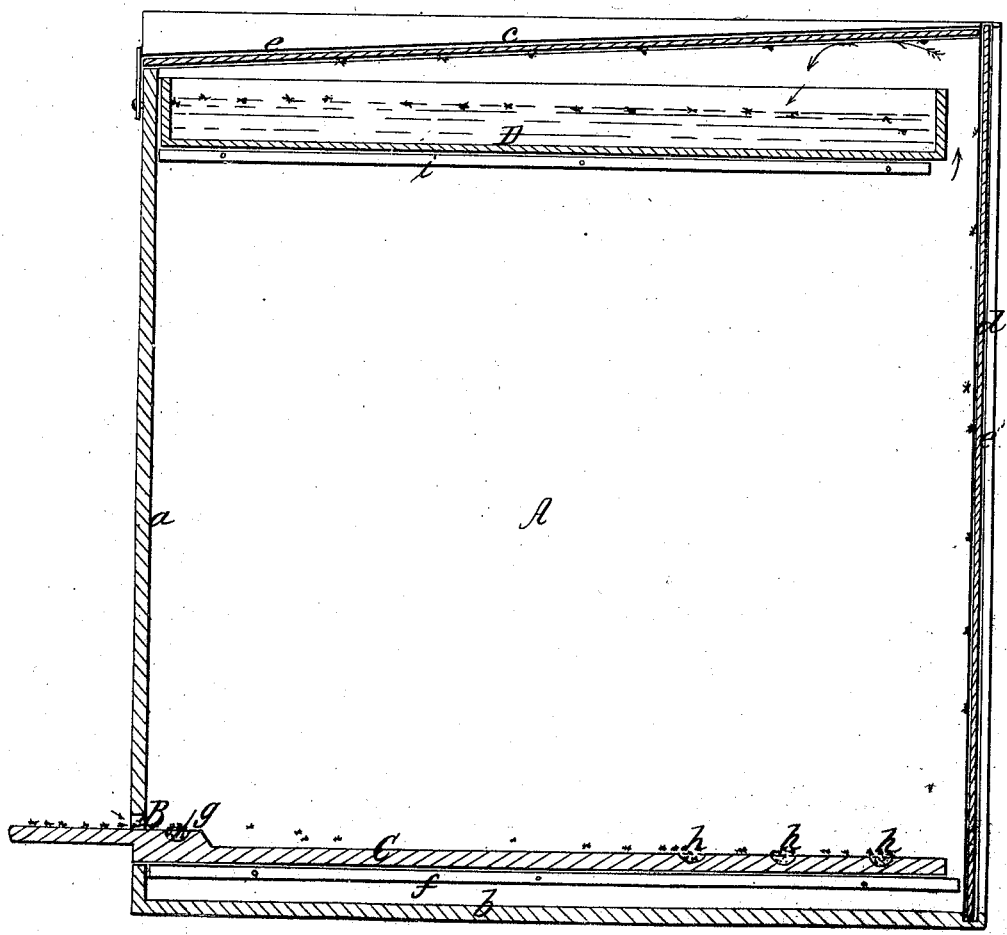

UNITED STATES PATENT OFFICE.

JOSEPH HYTER, OF KENT, INDIANA.

FLY-TRAP.

Specification of Letters Patent No. 15,378, dated July 22, 1856.

*To all whom it may concern:*

Be it known that I, JOSEPH HYTER, of Kent, in the county of Jefferson and State of Indiana, have invented a new and useful Improvement in Fly-Traps; and I do hereby declare that the following is a full, clear, and exact description of the same, reference being had to the accompanying drawing, forming a part of this specification.

The drawing exhibits a vertical longitudinal section of a fly trap constructed after my invention.

The nature of my invention consists in so constructing the trap that the flies, after being decoyed into it through a small opening at the front in seeking to escape, having satisfied their wants, shall be deluded by a very strong light from the back and top until they arrive over a trough filled with strong soap suds and are precipitated into it and drowned, as hereinafter described.

To enable others skilled in the art to make and use my invention, I will proceed to describe its construction and operation.

A, is a rectangular box. Its front $a$, and bottom $b$, are made of wood or other material which will not admit light, while its top $c$, and back $d$, are made of thin panes of window glass, which are fitted in grooves $e, e$, formed in the box so as to be capable of being taken out when necessary. The top pane is set inclined, so that the flies in flying against it, in the delusion that it is an open space, shall be thrown downward into a trough of soap suds and drowned.

B, is an inlet or decoy passage near the lower edge of the front $a$, of the box, and C, is a sliding bait-board extending from front to back and side to side of the box and arranged just below the decoy passage upon cleats $f$, as shown. This board is grooved at $g, h$, so as to retain the molasses or other condiments attractive to flies, as represented. The grooves $h, h, h$, are formed near the back of the box, while that $g$, is near the decoy passage. This is so in order that the flies after being attracted into the box by the condiment in $g$, shall be induced to pass as far from the decoy passage as possible and thereby lose track of it.

D, is a sliding removable trough, arranged near the top of the box, on cleats, in such a manner that a small space is left between its rear end and the back of the box A, and also between its upper edge and the top of said box, as represented. This trough is nearly filled with strong soap suds in order that the flies shall be drowned as soon as they are precipitated into it.

Operation: The flies enter the trap through the passage B, as illustrated, and after satisfying their wants from the bait-board seek to escape, and being attracted by strong light from the glass back they fly in that direction and being headed off crawl up the glass back until they nearly reach the upper edge of the same, when, being still attracted and deluded by light from the glass top, they attempt to fly upward or through the same and in doing so instead of rising, are, owing to the inclination of the glass top, precipitated into the trough of soap suds and drowned, as illustrated in the drawing.

This fly trap is exceedingly simple, quite cheap, and only costs about twenty-five cents, and has been tried and found to answer well the purpose intended.

What I claim as my invention and desire to secure by Letters Patent is,

A trap for catching flies having an opaque front and bottom $a, b$, inclined transparent back $d$, small front decoy passage B, grooved bait board C, and trough D substantially as set forth.

JOSEPH HYTER.

Witnesses:
 JOB HUGHES,
 WILLIAM C. ANDERSON.